May 19, 1925.
F. E. OWEN
1,538,583
GREASE CUP COVER HOLDER
Filed Oct. 24, 1924
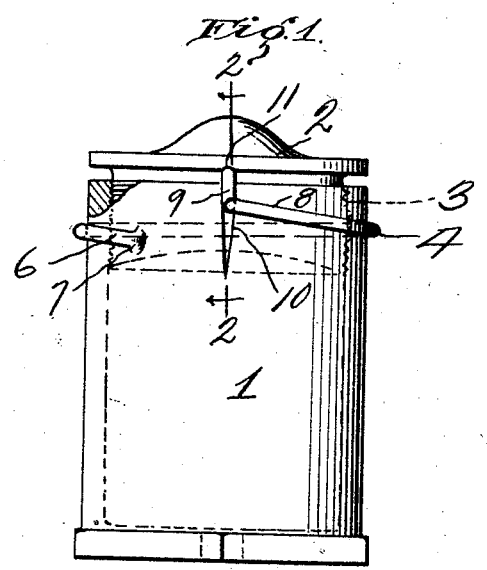
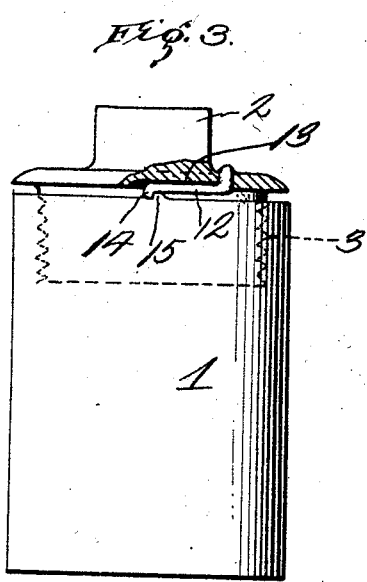
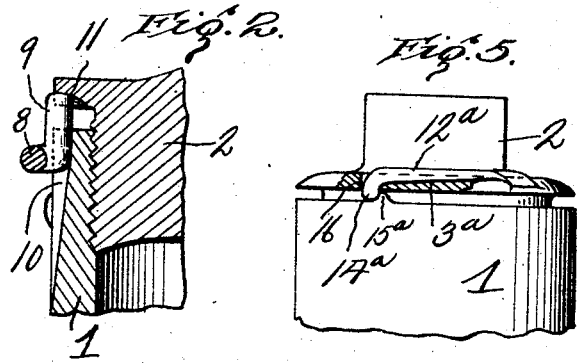
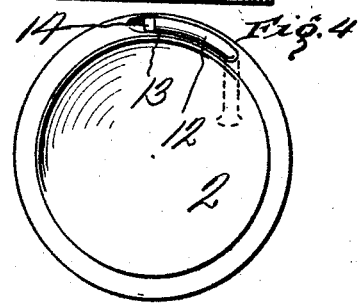
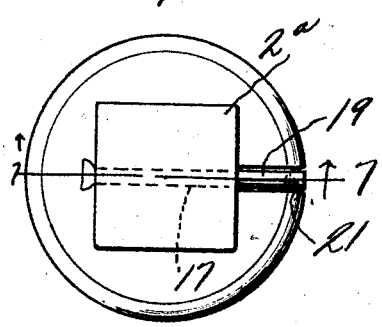
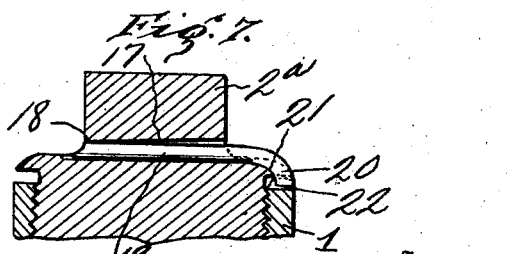
Inventor
F. E. Owen
By D. Swift
Attorney Patented May 19, 1925.

1,538,583

UNITED STATES PATENT OFFICE.

FRANCIS EDWARD OWEN, OF THISTLE, UTAH.

GREASE-CUP-COVER HOLDER.

Application filed October 24, 1924. Serial No. 745,597.

*To all whom it may concern:*

Be it known that I, FRANCIS EDWARD OWEN, a citizen of the United States, residing at Thistle, in the county of Utah, State of Utah, have invented a new and useful Grease-Cup-Cover Holder; and I do hereby declare the following to be a full, clear, and exact description of the invention, such as will enable others skilled in the art to which it appertains to make and use the same.

The invention relates to cover holders for grease cups and particularly of grease cups used on locomotive connecting rods and other movable parts, and has for its object to provide spring means cooperating with the cover and grease cup for holding the plug cover against unscrewing after the same has been screwed into the cup, thereby obviating the loss of screw covers of this character, which is a common difficulty now experienced.

A further object is to provide an annular spring having one of its ends anchored to the periphery of the cup and its other end terminating in a vertically disposed arm guidable in a slot in the cup and cooperating with a recess in the screw plug cover for holding said screw plug cover against retrograde movement after the same has been screwed to position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the grease cup, showing the cover retaining member carried thereby.

Figure 2 is a detail sectional view taken on line 2—2 of Figure 1.

Figure 3 is a side elevation of the grease cup showing another form of grease cup cover holder.

Figure 4 is a bottom plan view of the grease cup cover, shown in Figure 3,

Figure 5 is a side elevation of the upper portion of a grease cup showing another form of cover holder, and part of the cover broken away to better show the structure.

Figure 6 is a top plan view of a grease cup cover showing a further form of spring, Figure 7 is a detail sectional view taken on line 7—7 of Figure 6.

Referring to the drawing, the numeral 1 designates the body of the grease cup and 2 the closure therefor, which closure is threaded at 3 into the body of the grease cup in the usual manner. It has been found that the threaded closures 2 easily work loose and are lost incident to retrograde movement thereof when the cups are on movable parts, for instance as the connecting rods of locomotives. To obviate this difficulty an annular spring 4 is provided, which spring extends around the body 1 and has its end 6 anchored at 7 to the outer periphery of the body. The other end 8 of the annular spring terminates in a vertically disposed arm 9 which is slightly inset and disposed in a vertically disposed groove 10 in the side of the cup 1. The vertically disposed arm 9, when the threaded cap 2 is in closed position, engages in the recess 11 in the under side of the cap and holds the cap against retrograde movement, but allowing the same to be rotated in either direction when considerable power is applied thereto, however under ordinary conditions such as jar and vibration the spring positively holds the cap. It will be noted that by providing the annular spring, a considerable range of adjustment of the cap is possible and by disposing the arm 9 inset and in the groove 10, during the rotation of the cap, the annular spring 4 will be held against contraction and consequent binding on the outer periphery of the body 1.

Referring to Figures 3 and 4 the cap 2 is held by a concentrically disposed spring arm 12, which is secured to the cap and disposed in a concentric groove 13 in the under side of the cap. The spring arm 12 terminates in a downwardly extending lug 14, which cooperates with a lug 15 carried by the upper end of the cup body 1, and holds the plug closure 2 against retrograde rotation until considerable turning power is applied thereto, otherwise the operation is substantially the same as that shown in Figure 1.

Referring to Figure 5 wherein a further modified form is shown, the construction and operation is substantially the same as shown in Figures 3 and 4, with the exception the spring arm 12ª is disposed in a groove 13ª on the upper side of the plug closure 2, and has its downwardly extending lug 14ª, which extends through an aperture 15 in the plug closure and cooperates with a lug 15ª similar to the lug 15 in the form shown in Figure 3, and in the same manner as the device shown in Figure 3.

Referring to Figures 6 and 7 the plug closure 2 has its rectangular shaped wrench receiving portion 2ª provided with an aperture 17 which is radially disposed, and which aperture has anchored in one end thereof at 18 the spring arm 19. The spring arm 19 has a limited freedom of movement in the aperture 17 in a vertical plane and has its outer end provided with a downwardly extending arm 20 which extends through the notch 21 in the side of the plug closure and cooperates with a lug 22 carried by the upper end of the cup 1 in a manner similar to that shown in Figures 3 and 5. It will be seen that when the plug closure 2ª is rotated to a desired position, the spring arm will maintain the same against rotation in a retrograde direction until considerable power is applied thereto. In all of the devices shown the spring means is sufficiently strong to hold the closures against retrograde movement until considerable power is applied thereto, and sufficiently strong to prevent rotation under ordinary jars when the device is on a movable part of a machine, particularly a locomotive.

From the above it will be seen that a grease cup cover holder is provided, which cover holder is positive in its operation, formed from a single piece of spring wire or material and one which may be easily and quickly applied to grease cups as at present constructed.

The invention having been set forth what is claimed as new and useful is:—

The combination with a grease cup and a threaded closure threaded into said cup, of an annular spring member surrounding the cup, one end of said spring member being anchored to the cup, the other end of said spring member terminating in a vertically disposed inset arm disposed in a groove of the cup and cooperating with the threaded closure.

In testimony whereof I have signed my name to this specification in the presence of two subscribing witnesses.

FRANCIS EDWARD OWEN.

Witnesses:
  H. L. MOORE,
  W. W. McCLURE.